2 Sheets—Sheet 1.
N. B. WHITE.
CLOTHES-WRINGER.
No. 7,098. Reissued May 2, 1876.
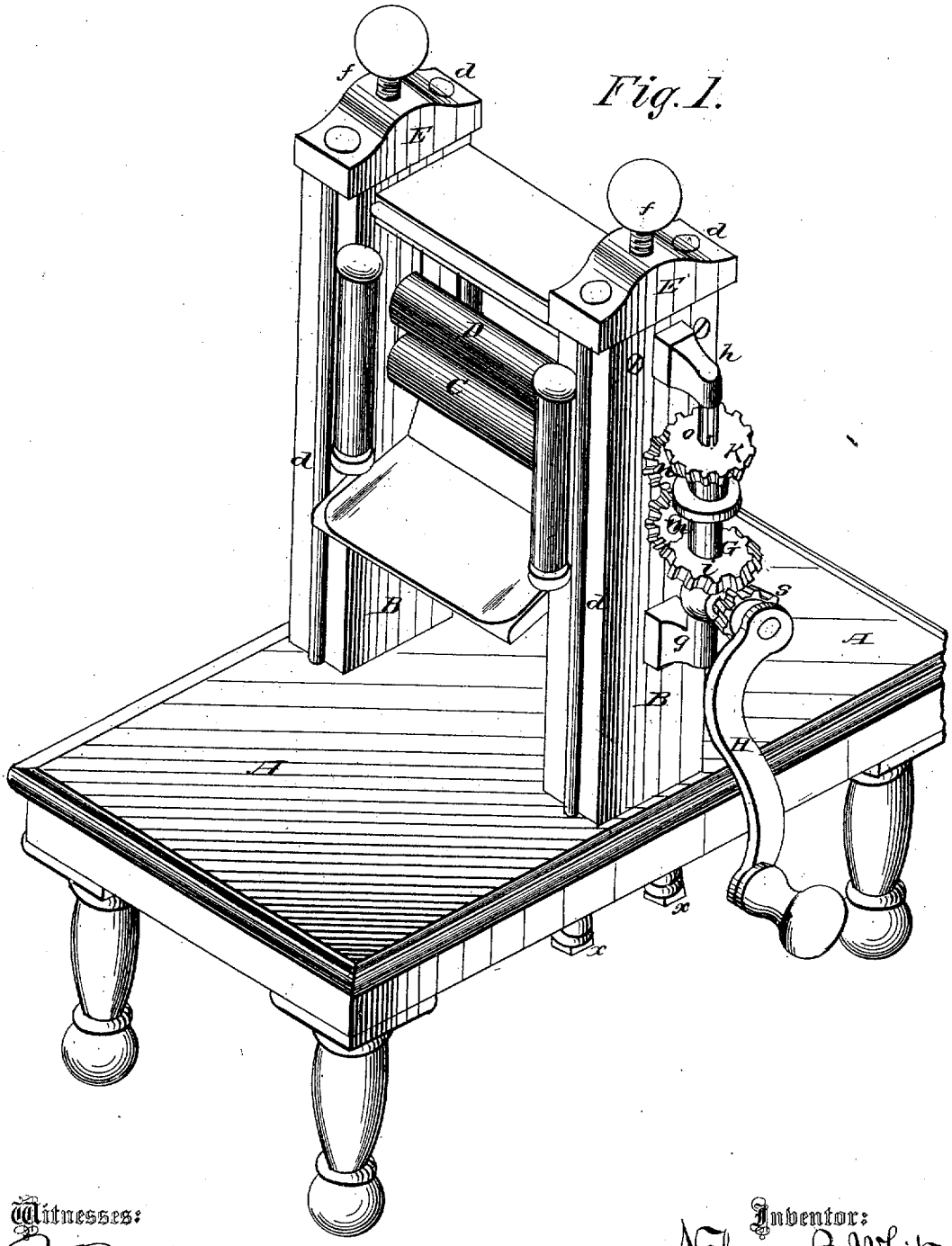
Witnesses:
P. C. Dieterich.
Wm. B. Upperman.
Inventor:
Nelson B. White
Per: C. H. Watson & Co. Attorneys.
N. PETERS, PHOTO-LITHOGRAPHER, WASHINGTON, D. C.

2 Sheets—Sheet 2.
N. B. WHITE.
CLOTHES-WRINGER.
No. 7,098. Reissued May 2, 1876.
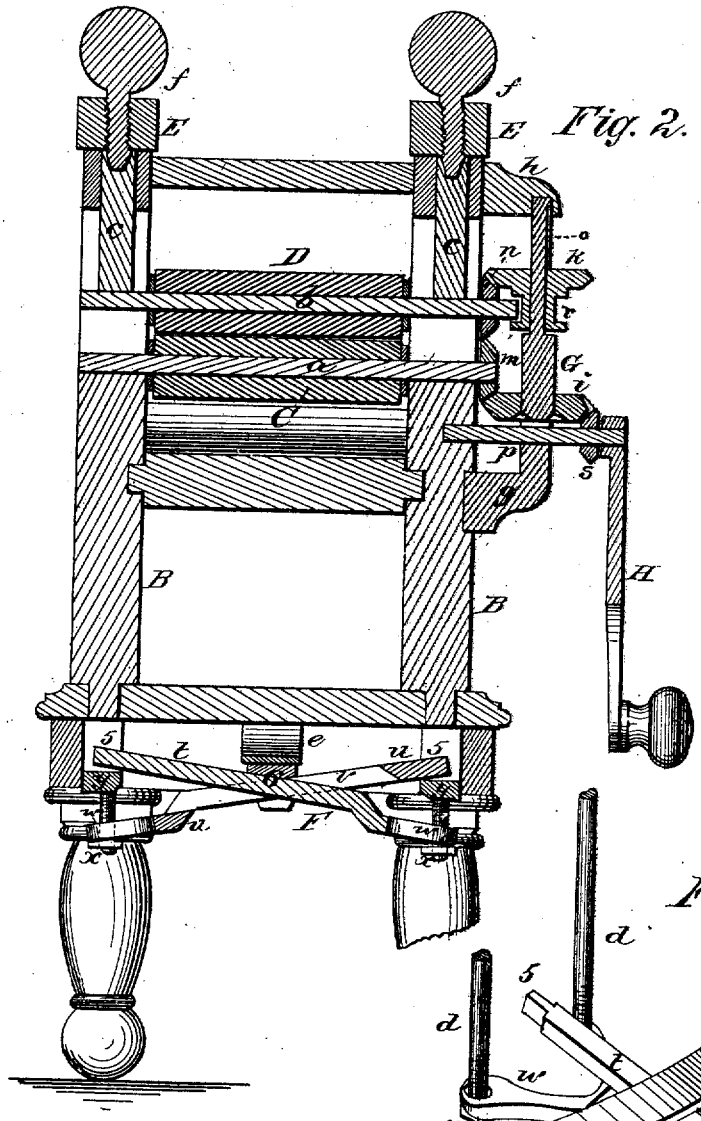
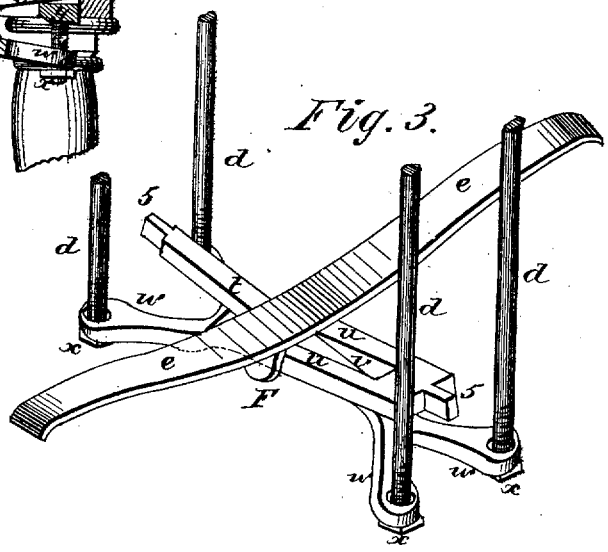
Witnesses:
P. C. Dieterich
Wm. H. Upperman
Inventor:
Nelson B. White
Per: C. H. Watson & Co. Attorneys.
N. PETERS, PHOTO-LITHOGRAPHER, WASHINGTON, D. C.

UNITED STATES PATENT OFFICE.

NELSON B. WHITE, OF SOUTH DEDHAM, MASSACHUSETTS, ASSIGNOR, BY MESNE ASSIGNMENTS, TO JACOB BRINKERHOFF.

IMPROVEMENT IN CLOTHES-WRINGERS.

Specification forming part of Letters Patent No. 34,618, dated March 4, 1862; reissue No. 2,227, dated June 12, 1866; reissue No. 7,098, dated May 2, 1876; application filed March 21, 1876.

*To all whom it may concern:*

Be it known that I, NELSON B. WHITE, of South Dedham, in the county of Norfolk and State of Massachusetts, have invented certain new and useful Improvements in Clothes-Wringers; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1 is a perspective view of a wringing-machine; Fig. 2, a vertical section through the same; Fig. 3, a detail to be referred to.

The nature of my invention consists in the construction and arrangement of a clothes-wringer, as will be hereinafter more fully set forth.

That others skilled in the art may understand and use this invention, I will now proceed to describe the same.

In the said drawings, A is a table intended to be of a convenient height and size to hold the tub or tubs. From this table rise two standards, B, in suitable bearings, in which run the shaft *a* of the lower roll C, and the shaft *b* of the upper roll D, the latter shaft bearing against boxes *c*, which are free to rise and fall in recesses in the standards. A head-block, E, on top of each standard B is connected by rods *d*, one on each side of the standard, with a frame, F, beneath the table. A spring, *e*, which extends lengthwise under the table, presses upon this frame F, (to be more particularly described hereafter,) and through the rods *d* presses down the blocks E. A set-screw, *f*, passes through each block E, and bears on the box *c*, so that the pressure of the spring *e* on the roll D may be adjusted. To the outside of one of the standards B is attached a bracket, *g*, and higher up another one, *h*. These support a vertical spindle, G, to which is attached a beveled gear, *i*. It also carries another gear, K, which is free to slide up and down on the spindle, but is carried round with it by means of a tongue, which enters a slot, *o*, in the spindle. A gear, *m*, on the shaft *a* engages with the gear *i*, and a gear, *n*, on the shaft *b*, with the gear K. The latter shaft *b* is prolonged and enters a groove, *r*, in the hub of the gear K. This permits the gear K to be carried up with the roll D as it rises. At the same time it continues engaged with the gear *n*, and the power applied to the lower gear *i* revolves both rolls with an equal speed, no matter at what distance they may be pressed apart by the article passing between them. A horizontal shaft, *p*, which passes through the head of the bracket *g* and enters the side of the standard, carries at its outer end a beveled pinion, *s*, which engages with the gear *i*, (which, it will be seen, is beveled on both sides.) The hand-crank H is attached to this pinion *s*, and by it the gear *i* and spindle G are revolved. In this manner the required vertical motion may be allowed to the roll D and the roll still be driven with the same surface motion as the lower roll, which is a great desideratum and prevents, in a great measure, the rubber covering of the roll from being twisted from the shaft. It is desirable that the roll in its vertical motion should remain parallel, or very nearly so, with the lower roll, not only on account of the operating of the gear, but also that its ends may slide snug and close to the standards without binding against them, as it would be if the roll was allowed to tilt up at one end when an article was passed through the rolls nearer to one end than to the other, or which was thicker at one part than at another. To accomplish this I have devised the following method of applying the power of the spring *e* to the roll D. The frame F, which is shown detached in Fig. 3, is formed of two parts, *t u*, the former passing through a slot, *v*, in the latter. The rods *d* pass through eyes *w* in the outer ends of these pieces *t* and *u*, and have nuts *x* on their ends. The other ends 5 of the pieces *t* and *u* rest on blocks or stirrups *y* attached to the table A. A block, 6, rests on the middle of the frame F, and the spring *e* bears on this block and against the under side of the table. Thus, whichever piece, *t* or *u*, is raised by the lifting of either end of the roll D, the spring *e* is compressed and is raised off from the other piece *t* or *u*, and the opposite end of the roll is permitted to follow up and keep parallel.

Advantage is derived in using the wringer arranged as set forth from having the rollers driven separately and independently of each other by the gears K and *n* and *i* and *m*, inasmuch as both rollers work together to grasp the article to be wrung between them, and draw it through the space between them without being subjected to anything like abrasion, as would happen if only one of the rollers was driven by gear and the other made to revolve by friction against the clothes.

It has been found that the rubber rolls will not withstand the crushing and bruising they are subjected to by the irregularities of the clothes or articles to be wrung if the rolls are driven as rapidly as the ordinary motion of the arm drives them with the crank attached to the shaft of one of the rolls in the ordinary way. But with a purchase-pinion, which is a pinion of smaller size than the gears on the ends of the rolls, with which it meshes, so that the careless operator cannot force the uneven articles through too rapidly, the elasticity of the rubber is preserved and its durability much prolonged.

I am aware that it is not new to operate the rolls of a wringing-machine by gearing, but I know of no previous example of a wringing-machine in which motion is transmitted from the crank to the rolls by means of a purchase cog-wheel. Neither am I aware that the rolls of a wringing-machine have hitherto been driven by what is known as a purchase cog-wheel, which means a cog-wheel of smaller size than the cogs upon the ends of the rolls, fixed upon an axis independent of the rolls, so that said cog can move, and, by intermediate mechanism, communicate motion to the cog-wheels on the ends of the roller-shaft.

Having thus described the invention, the following is what is claimed and desired to be secured by Letters Patent:

1. In a wringing-machine having rubber rolls, a purchase cog-wheel mounted upon an independent axis and connected, by gearing, with the cogs upon the ends of the roller-shafts, for the purpose set forth.

2. In a wringing machine for wringing clothes, the gear K, having groove *r* and the gears *n*, *i*, and *m*, and shafts *b* and G, arranged substantially as described, in combination with rolls of india-rubber, as set forth.

In testimony that I claim the foregoing I have hereunto set my hand this 21st day of December, 1875.

NELSON B. WHITE.

Witnesses:
FRANCIS TINKER,
C. F. O. TINKER.